United States Patent
Laaksonheimo et al.

(10) Patent No.: US 10,202,257 B2
(45) Date of Patent: Feb. 12, 2019

(54) METHOD AND SYSTEM FOR INCREASING THE AVAILABILITY OF AN ELEVATOR STANDING UNUSED AT A LANDING

(71) Applicants: Jyrki Laaksonheimo, Hyvinkaa (FI); Pasi Raassina, Numminen (FI)

(72) Inventors: Jyrki Laaksonheimo, Hyvinkaa (FI); Pasi Raassina, Numminen (FI)

(73) Assignee: Kone Corporation, Helsinki (FI)

( * ) Notice: Subject to any disclaimer, the term of this patent is extended or adjusted under 35 U.S.C. 154(b) by 784 days.

(21) Appl. No.: 14/618,640

(22) Filed: Feb. 10, 2015

(65) Prior Publication Data
US 2015/0175386 A1    Jun. 25, 2015

Related U.S. Application Data

(63) Continuation of application No. PCT/FI2013/050832, filed on Aug. 29, 2013.

(30) Foreign Application Priority Data

Sep. 4, 2012 (FI) .................................. 20125914

(51) Int. Cl.
*B66B 1/34* (2006.01)
*B66B 3/00* (2006.01)
(Continued)

(52) U.S. Cl.
CPC .............. *B66B 5/02* (2013.01); *B66B 1/34* (2013.01); *H02K 15/125* (2013.01); *H05B 1/0275* (2013.01); *Y02B 50/127* (2013.01)

(58) Field of Classification Search
CPC .......... B66B 5/02; B66B 1/34; H02K 15/125; H05B 1/0275; Y02B 50/127
(Continued)

(56) References Cited

U.S. PATENT DOCUMENTS 1,857,998 A    4/1932 Yearsley
3,445,743 A *  5/1969 Blair .................... H02K 15/125
                                                        318/436
(Continued)

FOREIGN PATENT DOCUMENTS

JP        2004244152 A     9/2004
WO    WO-2008085169 A1    7/2008
WO    WO-2009068724 A1    6/2009

OTHER PUBLICATIONS

International Search Report PCT/ISA/210 for International Application No. PCT/FI2013/050832 dated Nov. 13, 2013.
(Continued)

*Primary Examiner* — Jeffrey Donels
(74) *Attorney, Agent, or Firm* — Harness, Dickey & Pierce, P.L.C.

(57) ABSTRACT

In the method for increasing the availability of an elevator standing unused at a landing
  the ambient temperature of at least one electrical device of the elevator is measured; and
  when the ambient temperature falls below a threshold value, electric current is conducted to at least one electrical device of the elevator for warming the electrical device in question.
The patent application also includes an independent claim for a system for increasing the availability of an elevator standing unused at a landing.

14 Claims, 2 Drawing Sheets

(51) Int. Cl.
*B66B 5/02* (2006.01)
*H05B 1/02* (2006.01)
*H02K 15/12* (2006.01)

(58) Field of Classification Search
USPC .......................................................... 187/393
See application file for complete search history.

(56) References Cited

U.S. PATENT DOCUMENTS

| | | | |
|---|---|---|---|
| 3,582,712 A * | 6/1971 | Blair | G01R 31/343 |
| | | | 219/209 |
| 5,271,455 A | 12/1993 | Semple | |
| 7,866,446 B2 | 1/2011 | Lindegger | |
| 7,942,246 B2 | 5/2011 | Saarikoski et al. | |
| 8,220,590 B2 | 7/2012 | Chen et al. | |
| 8,614,565 B2 * | 12/2013 | Lubawy | B60L 7/10 |
| | | | 320/134 |
| 8,975,838 B2 * | 3/2015 | Versailles | H02P 3/00 |
| | | | 318/369 |
| 2007/0295566 A1 | 12/2007 | Lindegger | |
| 2010/0065380 A1 * | 3/2010 | Chen | B66B 1/302 |
| | | | 187/290 |
| 2010/0258383 A1 | 10/2010 | Saarikoski et al. | |

OTHER PUBLICATIONS

Written Opinion of the International Searching Authority PCT/ISA/237 for International Application No. PCT/FI2013/050832 dated Nov. 13, 2013.
Finnish Search Report for FI20125914 dated Jan. 21, 2013.

* cited by examiner

METHOD AND SYSTEM FOR INCREASING THE AVAILABILITY OF AN ELEVATOR STANDING UNUSED AT A LANDING

This application is a continuation of PCT International Application No. PCT/FI2013/050832 which has an International filing date of Aug. 29, 2013, and which claims priority to Finnish patent application number 20125914 filed Sep. 4, 2012, the entire contents of both which are incorporated herein by reference.

BACKGROUND

Field of the Invention

The invention relates to the field of elevator technology.

Related Art

When an elevator stands unused at a landing, the electrical devices of the elevator are not, generally speaking, used, in which case the temperature of them lowers.

A particularly steep drop in the temperature of the electrical devices of an elevator will occur, on the one hand, in a cold operating environment and, on the other hand, also when an elevator intended for a building is used in connection with the construction of the building, in which case the elevator might be exposed to the outdoor air because unfinished walls and ceilings do not yet offer shelter.

When an elevator stands unused at a landing, the condensation of moisture on the surface of electrical devices can form to be a problem. Moisture can cause a short-circuit and encourage corrosion on the circuit cards. Additionally, elevator components can comprise temperature sensors, which prevent a run with the elevator if the operating temperature differs from what is permitted. The use of temperature sensors is, on the other hand, appropriate e.g. for the reason that a possible reduction of friction when the temperature falls can cause problems with the traction sheave or with the braking surfaces of the machinery brake.

SUMMARY

The aim of the invention is to improve the availability of an elevator standing unused at a landing irrespective of ambient conditions. In the following, the availability of an elevator refers to the maintaining and/or improvement of the operating capability of the elevator.

This aim can be resolved according to the method and according to the system.

The dependent claims describe preferred embodiments of the method and of the system.

In the method for increasing the availability of an elevator standing unused at a landing the ambient temperature of at least one electrical device of the elevator is measured. When the ambient temperature falls below a threshold value, electric current is conducted to at least one electrical device of the elevator for warming the electrical device in question.

The system for increasing the availability of an elevator standing unused at a landing comprises a cubicle containing at least one electrical device of the elevator as well as means for supplying electric power to the electrical device. In addition, in the cubicle are means for determining the ambient temperature prevailing inside the cubicle as well as a control unit, which is configured to implement a method according to the invention.

By means of the method and the system, a decrease in the ambient temperature of an electrical device of an elevator can be prevented. As a result of this, it is possible to enable longer availability of an elevator standing unused at a landing. In this way we can increase the availability of an elevator.

When the conducting of electric current is implemented as a warm-up run of the elevator, it is possible to implement the warming of the elevator without using extra components for enabling longer availability of an elevator standing unused at a landing.

When the conducting of electric current is implemented in a stationary elevator, it is possible to utilize the dissipation occurring in electrical devices of the elevator for warming the electrical devices of the elevator.

If at least one of the electrical devices is an electric drive, most preferably a hoisting machine, or an electricity supply device of a hoisting machine such as more particularly a frequency converter or control card, comprised in an electric drive, an elevator control unit, a call-giving device, an electricity supply of the holding brakes or a control device of them, or a control device of an automatic door of the elevator, the critical parts of the hoisting machine can be kept warm.

When the electrical device, or at least one of the electrical devices, is a hoisting machine comprised in an electric drive, in which the excitation current that does not form rotating torque is used for warming the windings of the electric motor of the hoisting machine, it is possible to warm the hoisting machine effectively and simultaneously to reduce the need for extra parts.

When the electrical device, or at least one of the electrical devices, is a brake resistor in the intermediate circuit of the frequency converter of the hoisting machine comprised in the electric drive, which brake resistor is configured to consume the regenerative braking energy of the elevator motor as heat, it is possible to increase the versatility of the braking resistor and at the same time it is possible to implement warming of an electrical device of the elevator while at the same time reducing the need for extra parts.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION

Figure 1:
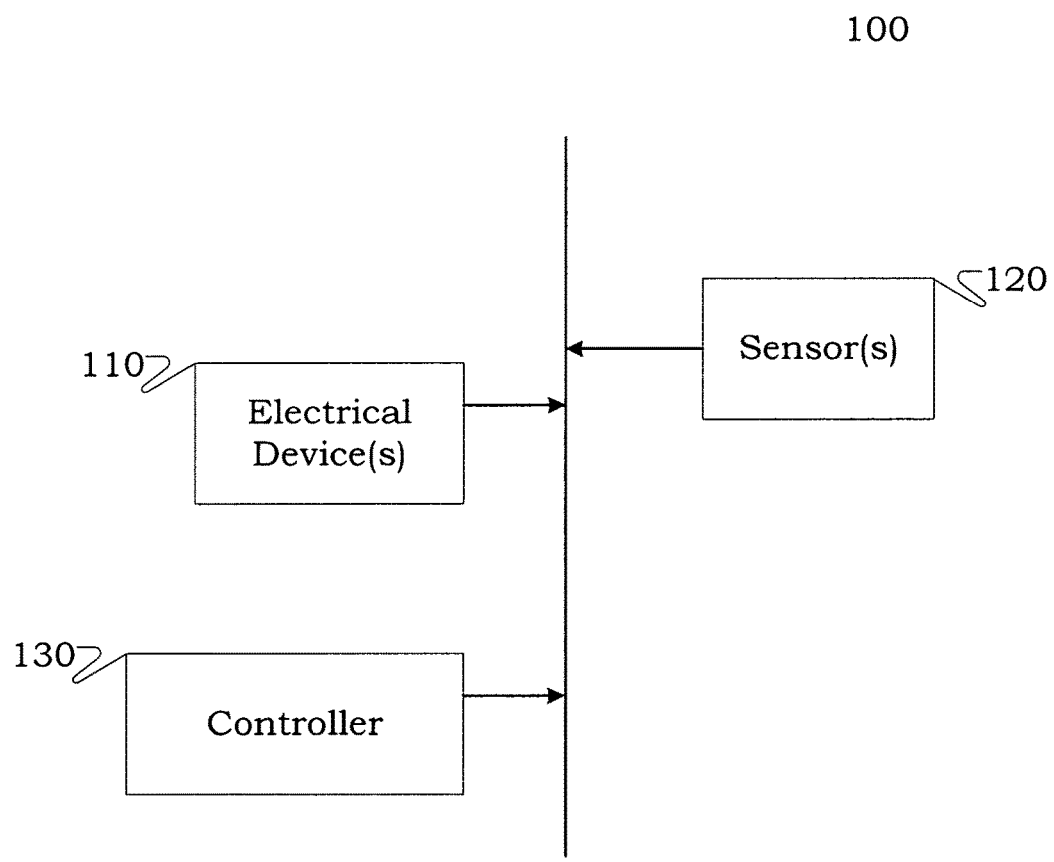
FIG. 1 is a block diagram of an elevator according to some example embodiments.
Figure 2:
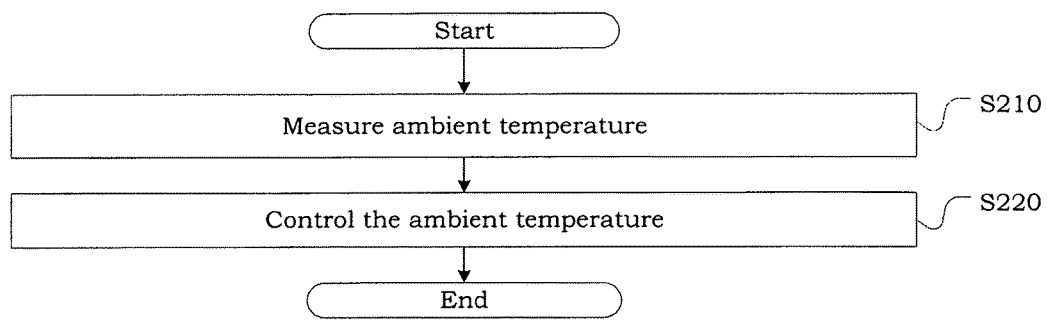
FIG. 2 is a method of controlling an ambient temperature of at least one electrical device of an elevator according to some example embodiments.

FIG. 1 is a block diagram of an elevator according to some example embodiments. FIG. 2 is a method of controlling an ambient temperature of at least one electrical device of an elevator according to some example embodiments.

Referring to FIGS. 1 and 2, an elevator 100 may include at least one electrical device 110, at least one sensor 120, and a controller 130.

In some example embodiments, in operation S210, the controller 130 may measure an ambient temperature of the at least one electrical device 110 based on data from the at least one sensor 120. In operation S220, the controller 130 may control the ambient temperature based a result of the measuring.

According to the invention the ambient temperature of the electrical devices of an elevator is measured and electric power is supplied to at least one electrical device according to need in such a way that the ambient temperature is not able to drop too low such that the aforementioned problems would start to appear.

This measurement must be implemented specifically during the standstill times of the elevator, i.e. during those times when there is no elevator travel and when the drive devices are able to cool owing to the standing of the elevator.

The method can be implemented with different embodiments.

We have designed at least the following two embodiments of the method:

A special warm-up run is, if necessary, driven with the elevator, in which case current must be supplied to the electrical devices needed for the warm-up run. In this case the electrical devices warm up.

Power is supplied to the elevator electrical devices of the elevator without driving with the elevator. The electrical devices to be supplied at any given time are selected on the basis of the measuring data received from sensors measuring the ambient temperature. This embodiment is preferred e.g. in situations when a run with the elevator is forbidden during a standstill of the elevator. In some elevator systems elevator travel is restricted e.g. at nighttime.

The aforementioned electrical devices can be e.g. an electric drive of an elevator, or more precisely a hoisting machine, or an electricity supply device (frequency converter) or control card (low-voltage card) of the hoisting machine, comprised in the electric drive. In this case heat can be effectively generated e.g. with the hoisting machine by supplying so-called excitation current, which does not form rotating torque but, however, generates heat in the windings of the electric motor of the hoisting machine. On the other hand, heat can also be effectively generated with a brake resistor possibly in the intermediate circuit of a frequency converter, which brake resistor consumes the regenerative braking energy of the elevator motor as heat.

The electrical device can be an elevator control unit, which controls the travel of the elevators in the elevator hoistway according to a speed reference.

The electrical device can be a call-giving device, with which an elevator call is given.

The electrical device can be an electricity supply device of, or control device of, the holding brakes of the hoisting machine of the elevator The electrical device can be a control device of an automatic door of the elevator.

More particularly problems might occur with electrical devices that are disposed in the elevator hoistway, such as fixed to a wall part of the elevator hoistway or disposed in the pit of the elevator hoistway.

A thermal resistor can be disposed in some electrical cubicle (cubicle), to which resistor current is supplied only for raising the ambient temperature of the electrical devices of the elevator.

The invention must not be regarded as being limited only to the claims below but instead should be understood to include all legal equivalents of said claims and combinations of the embodiments presented.

The invention claimed is:

1. A method for controlling an ambient temperature of at least one electrical device of an elevator standing unused at a landing, the method comprising:
   measuring the ambient temperature of the at least one electrical device of the elevator, the at least one electrical device being one or more of (i) a frequency converter or control card included in a hoisting machine of the elevator, (ii) an elevator control unit, (iii) a call-giving device, (iv) an electricity supply device for holding brakes, and (v) a control device of an automatic door of the elevator; and
   controlling the ambient temperature by supplying power to the at least one electrical device in response to the ambient temperature being below a threshold value.

2. The method according to claim 1, wherein the controlling comprises:
   supplying the power at a level sufficient to drive the elevator without passengers during a warm-up run of the elevator.

3. The method according to claim 1, wherein the controlling comprises:
   supplying the power to the at least one electrical device while the elevator remains stationary.

4. The method according to claim 1, wherein
   the at least one electrical device is the frequency converter or control card included in the hoisting machine, and
   excitation current that does not form rotating torque is used for warming windings of an electric motor of the hoisting machine.

5. The method according to claim 1, wherein the at least one electrical device is a brake resistor in an intermediate circuit of the frequency converter of the hoisting machine, the brake resistor being configured to consume regenerative braking energy of an elevator motor of the hoisting machine as heat.

6. An elevator comprising:
   at least one electrical device, the at least one electrical device being one or more of (i) a frequency converter or control card included in a hoisting machine of the elevator, (ii) an elevator control unit, (iii) a call-giving device, (iv) an electricity supply device for holding brakes, and (v) a control device of an automatic door of the elevator;
   at least one sensor configured to measure an ambient temperature of the at least one electrical device; and
   a controller configured to control the ambient temperature by supplying power to the at least one electrical device in response to the ambient temperature being below a threshold value.

7. The elevator according to claim 6, wherein the controller is configured to supply the power at a level sufficient to drive the elevator without passengers during a warm-up run of the elevator.

8. The elevator according to claim 6, wherein the controller is configured to supply the power to the at least one electrical device while the elevator remains stationary.

9. The elevator according to claim 6, wherein
   the at least one electrical device is the frequency converter or control card included in the hoisting machine, and
   excitation current that does not form rotating torque is used for warming windings of an electric motor of the hoisting machine.

10. The elevator according to claim 6, wherein the at least one electrical device is a brake resistor in an intermediate circuit of the frequency converter of the hoisting machine, the brake resistor being configured to consume regenerative braking energy of an elevator motor of the hoisting machine as heat.

11. The method according to claim 1, wherein the measuring includes measuring the ambient temperature using at least one sensor such that a same one of the at least one sensor is also configured to instruct a controller to prevent running of the elevator in response to the ambient temperature being below a second threshold.

12. The elevator according to claim 6, wherein a same one of the at least one sensor is also configured to instruct the controller to prevent running of the elevator in response to the ambient temperature being below a second threshold.

13. The method according to claim 1, wherein the controlling comprises:
supplying the power directly to the at least one electrical device to operate same.

14. The elevator according to claim 6, wherein the controller is configured to supply the power directly to the at least one electrical device to operate same.

* * * * *